(12) United States Patent
Benhase et al.

(10) Patent No.: US 8,468,312 B2
(45) Date of Patent: Jun. 18, 2013

(54) INDICATION OF A DESTRUCTIVE WRITE VIA A NOTIFICATION FROM A DISK DRIVE THAT EMULATES BLOCKS OF A FIRST BLOCK SIZE WITHIN BLOCKS OF A SECOND BLOCK SIZE

(75) Inventors: Michael T. Benhase, Tucson, AZ (US); Andrew B. McNeill, Jr., Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/454,892

(22) Filed: Apr. 24, 2012

(65) Prior Publication Data
US 2013/0047033 A1    Feb. 21, 2013

Related U.S. Application Data

(63) Continuation of application No. 13/212,383, filed on Aug. 18, 2011.

(51) Int. Cl.
*G06F 12/00*    (2006.01)

(52) U.S. Cl.
USPC ........................................... 711/155; 714/6.1

(58) Field of Classification Search
USPC .......................................... 711/155; 714/6.1
See application file for complete search history.

(56) References Cited

U.S. PATENT DOCUMENTS

| 2003/0088732 | A1 | 5/2003 | Tadroda et al. |
| 2005/0036381 | A1 | 2/2005 | Hassner et al. |
| 2009/0055682 | A1* | 2/2009 | Gibson et al. ..................... 714/6 |
| 2009/0300466 | A1* | 12/2009 | Yoshimura ..................... 714/769 |
| 2009/0313498 | A1* | 12/2009 | Igashira et al. .................. 714/6 |
| 2010/0100694 | A1* | 4/2010 | Hwang et al. ................. 711/155 |
| 2010/0106894 | A1* | 4/2010 | Zhou et al. .................... 711/103 |
| 2011/0170212 | A1* | 7/2011 | Choi et al. ....................... 360/31 |
| 2012/0072680 | A1* | 3/2012 | Kimura et al. ................ 711/154 |

FOREIGN PATENT DOCUMENTS

| CN | 1581055 | 2/2005 |
| CN | 101349979 | 1/2009 |

OTHER PUBLICATIONS

U.S. Appl. No. 13/113,546 entitled "Writing of Data of a First Block Size in a Raid Array that Stores and Mirrors Data in a Second Block Size", filed May 23, 2011 by inventors M.T. Benhase, R. Galbraith, I.D. Judd, D.F. Moertl, and R.C. Nielsen.

(Continued)

*Primary Examiner* — Jared Rutz
(74) *Attorney, Agent, or Firm* — Rabindranath Dutta; Konrad Raynes Davda & Victor LLP

(57) ABSTRACT

A disk drive receives a request to write at least one block of a first block size, wherein the disk drive is configured to store blocks of a second block size that is larger in size than the first block size. The disk drive stores a plurality of emulated blocks of the first block size in each block of the second block size. The disk drive generates a read error, in response to reading a selected block of the second block size in which the at least block of the first block size is to be written via an emulation. The disk drive performs a destructive write of selected emulated blocks of the first block size that caused the read error to be generated. The disk drive writes the at least one block of the first block size in the selected block of the second block size.

10 Claims, 8 Drawing Sheets

OTHER PUBLICATIONS

U.S. Appl. No. 13/113,562 entitled "Writing of Data of a First Block Size in a Raid Array that Stores and Mirrors Data in a Second Block Size", filed May 23, 2011 by inventors M.T. Benhase, A. Nose, and M. Sugiura.

U.S. Appl. No. 13/212,383, filed Aug. 18, 2011, entitled "Indication of a Destructive Write Via a Notification From a Disk Drive That Emulates Blocks of a First Block Size Within Blocks of a Second Block Size", invented by M.T. Benhase et al. [18.419 (Appln)].

Preliminary Remarks for U.S. Appl. No. 13/212,383, filed Apr. 24, 2012, 7 pp. [18.419 (PrelimRemarks)].

PCT Search Report and Written Opinion mailed Oct. 4, 2012 for Application Serial No. PCT/CN2012/077683, filed Jun. 28, 2012.

Document entitled Information Materials for IDS, pp. 1-4.

* cited by examiner

US 8,468,312 B2

INDICATION OF A DESTRUCTIVE WRITE VIA A NOTIFICATION FROM A DISK DRIVE THAT EMULATES BLOCKS OF A FIRST BLOCK SIZE WITHIN BLOCKS OF A SECOND BLOCK SIZE

CROSS-REFERENCE TO RELATED APPLICATION

This application is a continuation of U.S. patent application Ser. No. 13/212,383, filed Aug. 18, 2011, which application is incorporated herein by reference in its entirety.

BACKGROUND

1. Field

The disclosure relates to a method, system, and computer program product for the indication of a destructive write via a notification from a disk drive that emulates blocks of first block size within blocks of a second block size.

2. Background

A plurality of disks may be coupled to a storage controller that controls the plurality of disks. For example, disks configured as Just a Bunch of Disks (JBOD), Redundant Array of Independent Disks (RAID), etc., may be coupled to storage controller. One or more hosts coupled to the storage controller may perform Input/Output (I/O) operations with respect to the plurality of disks by sending commands to the storage controller.

A sector is a specifically sized division of a disk. Previously, one sector of a disk was generally configured to hold 512 bytes of information. However, recently certain disks are being configured to hold 4096 bytes (i.e., 4 Kilobyte) of information by disk manufacturers.

A block is a group of sectors of a disk that an operating system can address. Count-key-data (CKD) is a disk data organization model of certain operating systems in which the disk is assumed to be comprised of a fixed number of tracks, each having a maximum data capacity. Multiple records of varying length may be written on each track of a CKD disk, and the usable capacity of each track depends on the number of records written to the track. CKD architecture derives its name from the record format, which comprises a field containing the number of bytes of data and a record address, an optional key field, and the data itself. CKD records are stored in 512 byte blocks and the operating system resident on a host may address the 512 byte blocks. Certain other disk data organization models may also be addressed by an operating system in 512 byte blocks.

SUMMARY OF THE PREFERRED EMBODIMENTS

Provided are a method, a system, and a computer program product in which a disk drive receives a request to write at least one block of a first block size, wherein the disk drive is configured to store blocks of a second block size that is larger in size than the first block size, and wherein the disk drive stores via emulation a plurality of emulated blocks of the first block size in each block of the second block size. The disk drive generates a read error, in response to reading a selected block of the second block size in which the at least one block of the first block size is to be written via the emulation. The disk drive performs a destructive write of selected emulated blocks of the first block size that caused the read error to be generated. The disk drive writes the at least one block of the first block size in the selected block of the second block size. The disk drive sends a notification to indicate the performing of the destructive write.

In additional embodiments, the first block size is 512 bytes, and the second block size is 4 Kilobytes.

In yet additional embodiments, the notification is sent asynchronously to a controller, and the disk drive maintains an indicator that indicates those emulated blocks on which the destructive write is performed, wherein the request to write the at least one block of a first block size is satisfied, even in response to the read error being generated.

In further embodiments, a controller receives the notification sent by the disk drive. The controller restores data in the selected emulated blocks on which the destructive write was performed by the disk drive, by copying the data from mirrored data corresponding to the data in the selected emulated blocks, wherein the mirrored data is maintained via the controller.

In yet further embodiments, the disk drive is coupled to a controller that mirrors data stored in the disk drive. The request is received by the controller from a host whose operating system is configured to access the blocks of the first block size configured as 512 bytes. Furthermore, disks maintained by the disk drive have lesser tolerance for wasted storage space and greater tolerance for increased processing time for executing read and write operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Emulation for Storing 512 Byte Blocks in 4 K Blocks

Physical disks were previously configured into 512 byte sectors by disk manufacturers. Recently physical disks that are configured into 4 Kilobyte sectors have become available. However, certain disk data organization models such as CKD rely on operating system accesses via 512 byte blocks even when physical disks that are configured onto 4K blocks are used.

In certain embodiments, a disk drive that stores data in 4K blocks emulates the storage of 512 byte blocks within the 4K blocks. However, when data is read an entire 4block has to be read, In certain embodiments in which storage space is not to be wasted, a disk drive may emulate a plurality of 512 byte block to be stored within a 4K block. For example, if eight 512 blocks are emulated to be stored within a single 4K block, then no space is wasted within the single 4K block. However, there is a performance penalty as the disk drive is configured to perform I/O with respect to the entirety of the 4K block. For example, if even a single emulated 512 byte block is to be written within a 4K block, the entire 4K block has to be read, prior to any modifications and writing to the 4K block.

In certain embodiments, in response to a 4K block being read by a storage drive to satisfy a write request for certain 512 byte blocks, a media error may be generated. The media error may be an uncorrectable error. However, it is not desirable to fail the write request. In certain embodiments, emulated 512 byte blocks that cause the generation of read error within a 4K byte block are destructively written, i.e., data stored in the emulated 512 byte blocks that cause the generation of read error are indicated as being destroyed and no longer valid. A notification of the destructive writing is sent to the controller by the disk drive, and the write request is satisfied. Subsequently, the controller may use previously stored mirrored data controlled by the controller to restore the data in the destructively written emulated 512 blocks. It may be noted that the disk drive is not aware of the mirroring of data performed by the controller.

Neither hosts nor the disk drives have to be aware of the block size that is natively supported by the other. The disk drives perform the emulation of blocks of a smaller block size used natively by the operating system of a host to provide a mapping to blocks of a larger block size used natively by a configuration of disks.

Exemplary Embodiments

Figure 1:
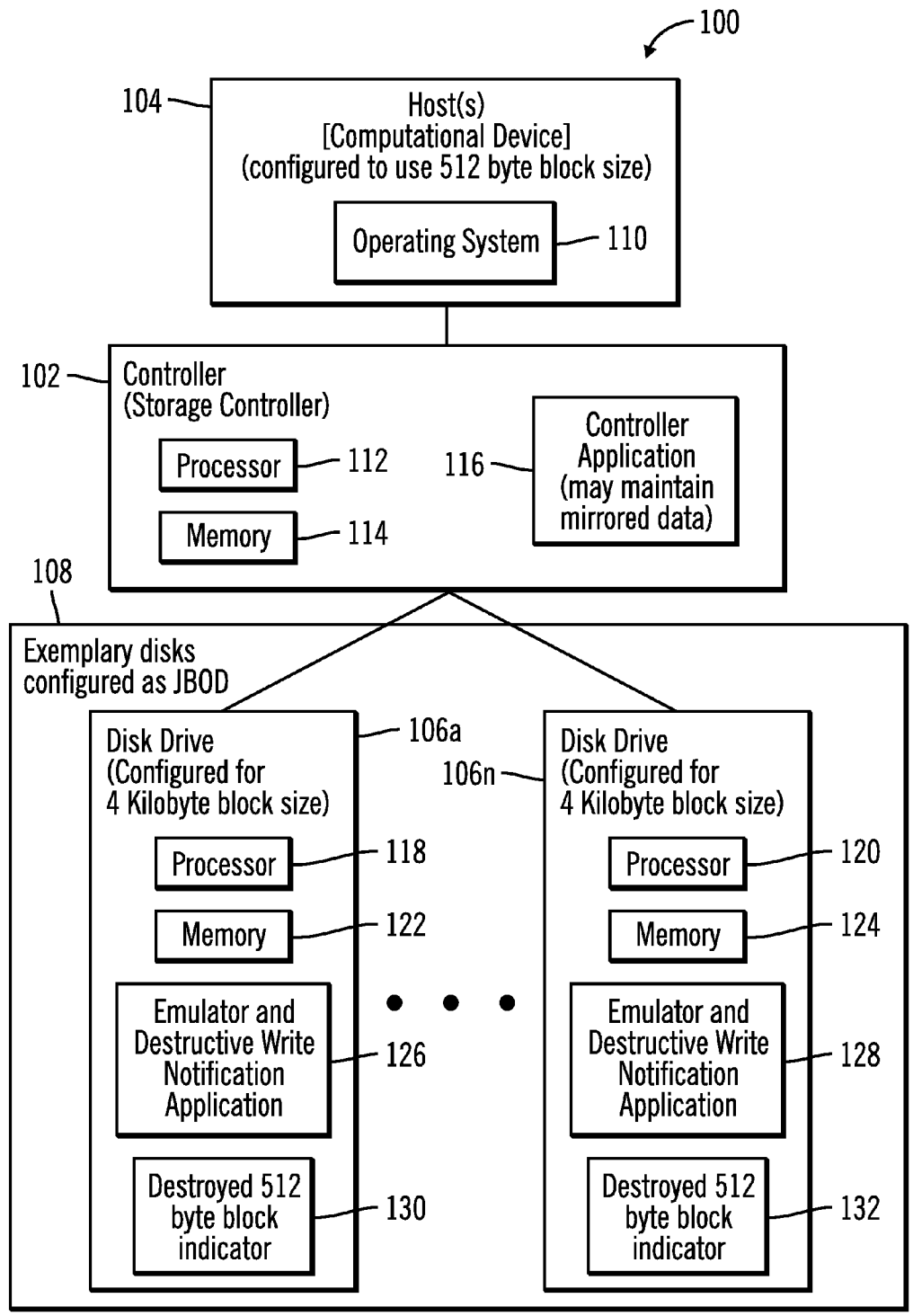
FIG. 1 illustrates a block diagram of a computing environment that includes a controller coupled to a host and a plurality of disks configured in a JBOD configuration, in accordance with certain embodiments.

FIG. 1 illustrates a block diagram of a computing environment 100 that includes a controller 102 coupled to one or more hosts 104 and a plurality of disk drives 106a . . . 106n configured to control disks in an exemplary Just a Bunch of Disks (JBOD) configuration 108, in accordance with certain embodiments. Other disk configuration, such as a Redundant Array of Independent Disks (RAID) may be used in alternative embodiments.

The controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The plurality of disk drives 106a . . . 106n may control any suitable physical hard disks known in the art. In alternative embodiments, the plurality of disk drives 106a . . . 106n may control other types of disks such as solid state disks, optical disks, etc.

The host 104 may include an operating system 110 that is configured to use a 512 byte block size for accessing blocks. Each of the exemplary disks 108 is configured for a 4 Kilobyte block size. Reading with respect to the plurality of disks controlled by the disk drives 106a . . . 106n may therefore be performed in a block size of 4 Kilobytes. Therefore, in embodiments shown in FIG. 1, the plurality of disks of the JBOD configuration 108 are configured for a 4 Kilobyte block size whereas the operating system 110 on the host 104 is configured to use a 512 byte block size.

The controller 102 includes a processor 112, a memory 114, and a controller application 116. The controller application 116 may be implemented in hardware, software, firmware or any combination thereof and may also mirror data stored in the exemplary disks 108 of the disk drives 106a . . . 106n.

Disk drives 106a . . . 106n include processors 118, 120 and memory 122, 124 as shown in the exemplary disk drives 106a, 106n of FIG. 1. Each disk drive also executes an emulator and destructive write notification application (shown via reference numerals 126, 128) that emulates 512 byte blocks within 4K byte blocks natively supported by each disk drive. The emulator and destructive write notification application 126, 128 also sends notification to the controller 102 when destructive writes are performed on emulated 512 byte blocks within the natively supported 4K blocks. The emulator and destructive write notification application 126, 128 further keeps track of the destructively written 512 byte blocks in indicators 130, 132 stored within the disk drives 106a . . . 106n.

The emulator and destructive write notification application 126, 128 interprets input/output (I/O) requests for 512 byte blocks from the host 104 and maps such requests to read and write data with respect to the disks in the JBOD configuration 108 via emulation. The host 104 does not have to be informed by the disk drives 106a . . . 106n as to whether or not the disk drives 106a . . . 106n support the 512 byte block size used by the operating system 110 of the host 104.

Figure 2:
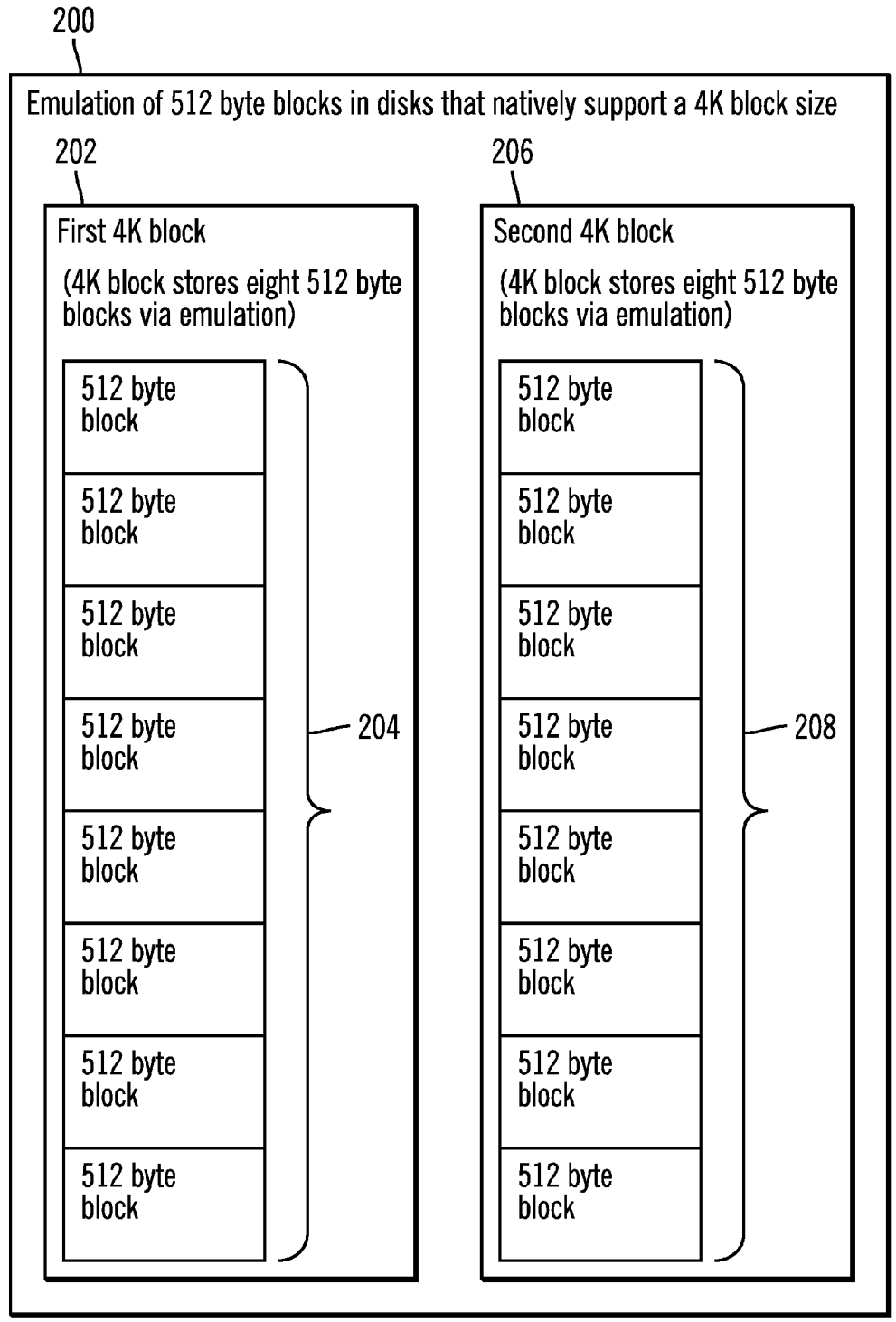
FIG. 2 illustrates a block diagram that shows emulation of 512 byte blocks in disks configured with a 4K block size, in accordance with certain embodiments.

FIG. 2 illustrates a block diagram 200 that shows the emulation of 512 byte blocks disks that natively support a 4K block size, in accordance with certain embodiments. A first 4K block 202 stores eight 512 byte blocks 204 without wasting any storage space. Similarly, a second 4K block 206 stores eight 512 byte blocks 208 without wasting any storage space. In alternative embodiments, a fewer number of 512 byte blocks may be emulated within each 4K block, and as a result some storage space may not be used.

Figure 3:
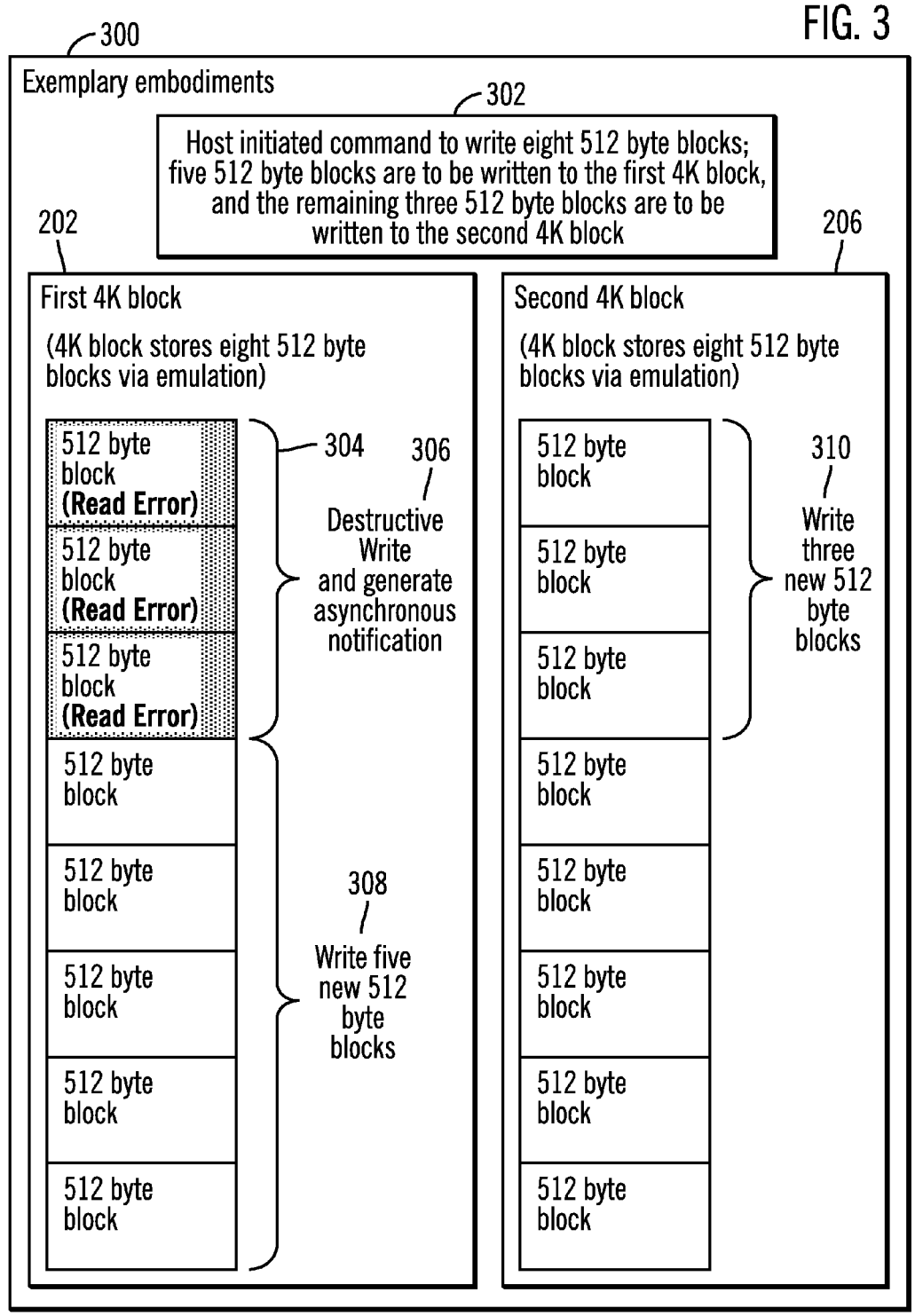
FIG. 3 illustrates a block diagram that shows how destructive writes and asynchronous notification are performed by a disk drive, in accordance with certain embodiments.

FIG. 3 illustrates a block diagram 300 that shows how destructive writes and asynchronous notification are performed by a disk drive, in accordance with certain embodiments. A host 104 initiated command to write eight 512 byte blocks is received by a disk drive 106a via a controller 102, where five 512 byte blocks are to be written to the first 4K block 202, and the remaining three 512 byte blocks are to be written to the second 4K block 206 (shown via reference numeral 302). It is not necessary for data to be stored in an aligned manner during the emulation of 512 byte blocks within 4K blocks.

In certain embodiments, on receiving the write request, the disk drive 106a attempts to read the first 4K block and generates a read error because certain 512 byte blocks (shown via reference numeral 304) cannot be read. The disk drive 106a performs a destructive write of the blocks 304 and generates an asynchronous notification of the destructive write for sending to the controller 102 (as shown via reference numeral 306). Also, the five new 512 byte blocks are written (shown via reference numeral 308) in the first 4K block 202, and the three new 512 byte blocks are written (shown via reference numeral 310) in the second 4K block 206.

Figure 4:
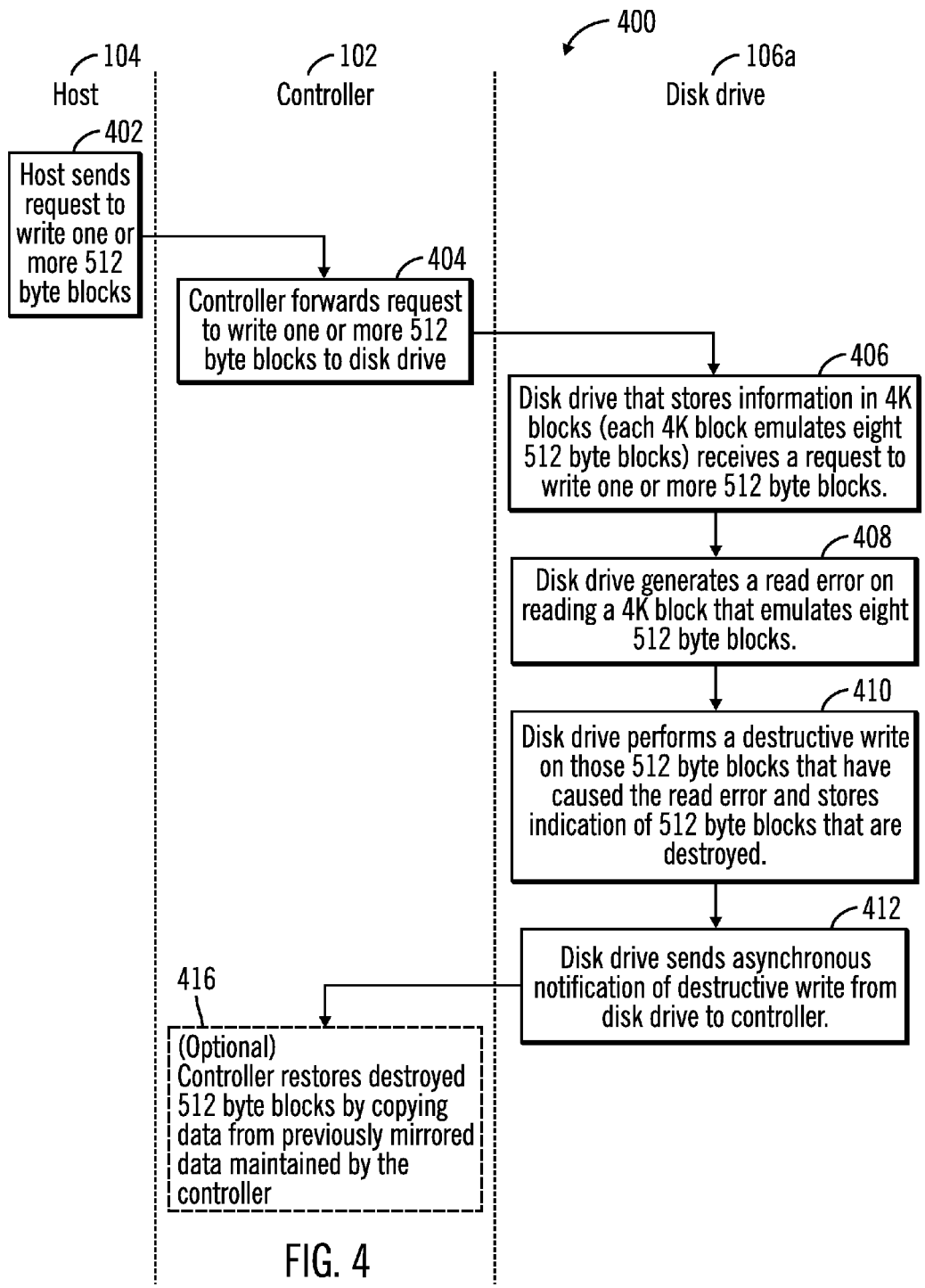
FIG. 4 illustrates a flowchart that shows certain operations performed by a host, a controller, and a disk drive, in accordance with certain embodiments.

FIG. 4 illustrates a flowchart 400 that shows certain operations performed by a host 104, a controller 102, and an exemplary disk drive 106a, in accordance with certain embodiments.

Control starts at block 402 where a host 104 sends a request to write one or more 512 byte blocks to the controller 102. The controller 102 processes and then forwards (at block 404) the request to write one or more 512 byte blocks to disk drive 106a. The disk drive 106a that stores information in 4K blocks (each 4K block emulates eight 512 byte blocks) receives (at block 406) the request to write one or more 512 byte blocks.

The disk drive 106a generates (at block 408) a read error on reading a 4K block that emulates eight 512 byte blocks. The read error may be caused when certain 512 byte blocks stored within the 4K block cannot be read.

In response to the read error, the disk drive 106a performs (at block 410) a destructive write on those 512 byte blocks that have caused the read error and stores an indication of 512 byte blocks that are destroyed in the indicator 130. The disk drive 106a sends (at block 412) an asynchronous notification of destructive write from the disk drive 106a to the controller 102.

In certain embodiments, on receiving the notification of destructive write, the controller 102 may optionally restore (at block 416) destroyed 512 byte blocks by copying data from previously mirrored data maintained by the controller 102. For example, if the controller 102 has been mirroring data, then the destructively written data is still available and the 512 byte blocks that are destroyed may be corrected by copying data from the previously mirrored data. It is preferable not to delay the restoration of destroyed data as the mirrored data may potentially become unavailable in the future because of various reasons, and in such circumstances the mirrored data may not be available for restoration of the destroyed data.

Figure 5:
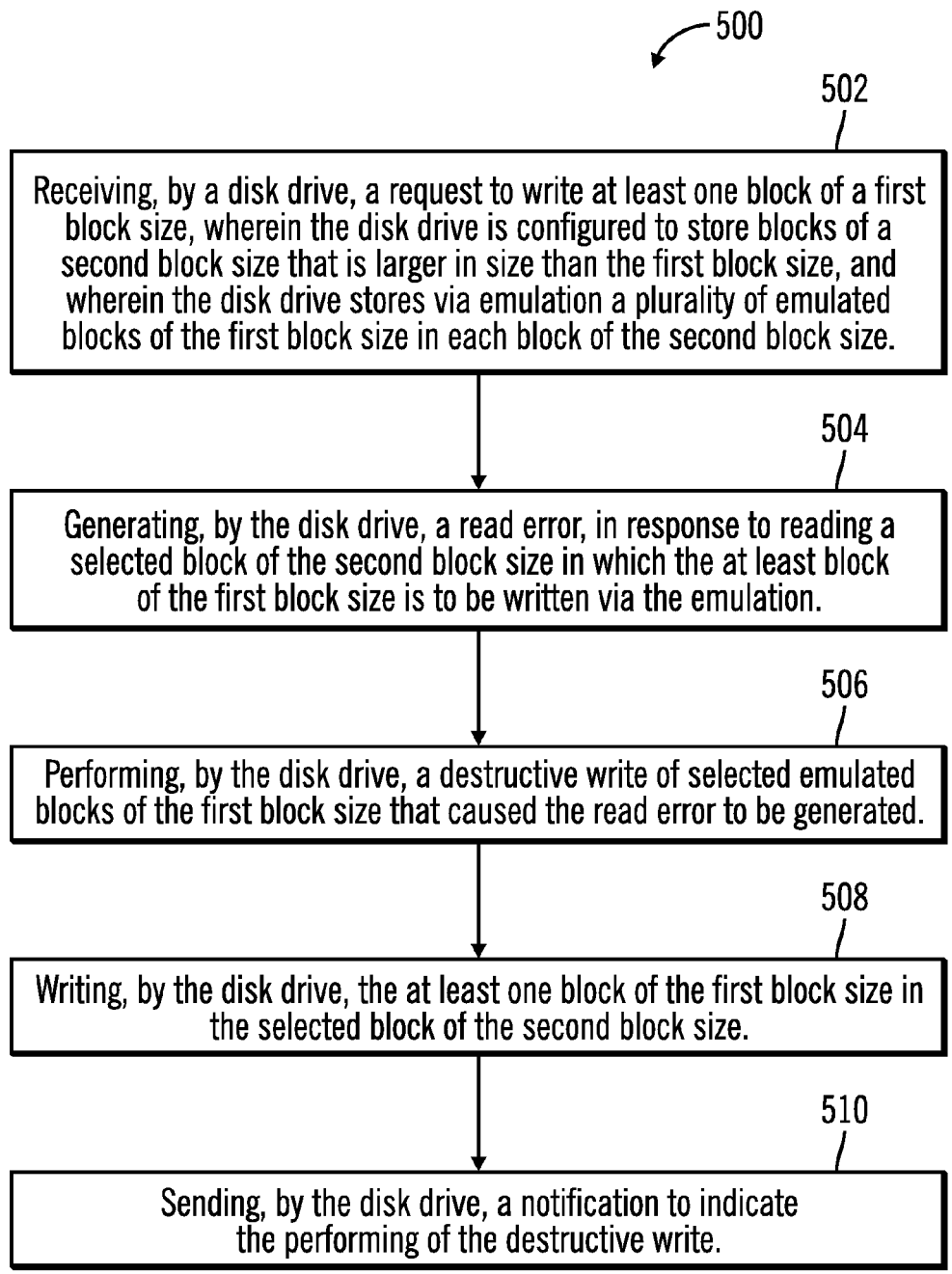
FIG. 5 illustrates a flowchart that shows certain operations performed by a disk drive, in accordance with certain embodiments.

FIG. 5 illustrates a flowchart that shows certain operations 500 performed by a disk drive 106a, in accordance with certain embodiments. The operations 500 shown in FIG. 5 may be performed by the emulator and destructive write notification application 126 that executes within the disk drive 106a.

The disk drive 106a receives (at block 502) a request to write at least one block of a first block size, wherein the disk drive 106a is configured to store blocks of a second block size that is larger in size than the first block size, and wherein the disk drive 106a stores via emulation a plurality of emulated blocks of the first block size in each block of the second block size. In certain embodiments, the first block size is 512 bytes, and the second block size is 4 Kilobytes.

Control proceeds to block 504, in which the disk drive 106a generates a read error, in response to reading a selected block (shown via reference numeral 202 in FIG. 3) of the second block size in which the at least block of the first block size is to be written via the emulation. The disk drive 106a performs (at block 506) a destructive write of selected emulated blocks (shown via reference numeral 304 in FIG. 3) of the first block size that caused the read error to be generated.

Control proceeds to block 508, in which the disk drive 106a writes the at least one block (shown via reference numeral 308 in FIG. 3) of the first block size in the selected block of the second block size. The disk drive 106a sends (at block 510) a notification to indicate the performing of the destructive write.

Figure 6:
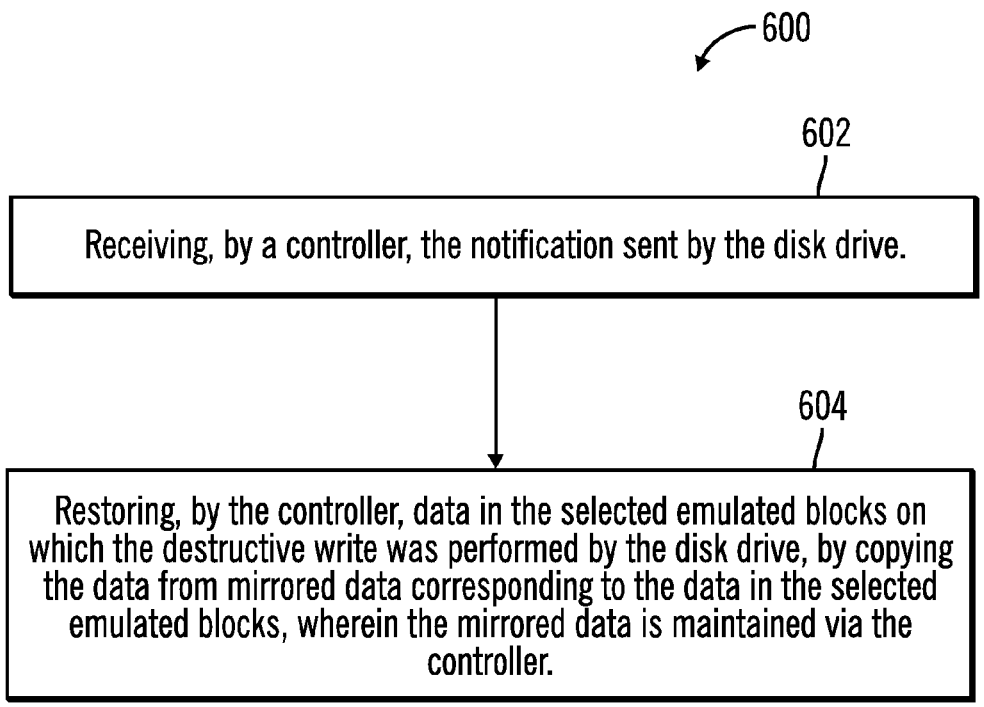
FIG. 6 illustrates a flowchart that shows certain operations performed by a controller, in accordance with certain embodiments.

FIG. 6 illustrates a flowchart 600 that shows certain operations performed by a controller 102, in accordance with certain embodiments. The operations shown in FIG. 6 may be performed by the controller application 116 that executes within the controller 102.

Control starts at block 602, in which, in response to the disk drive 106a sending (at block 510 of FIG. 5) the notification to indicate the performing of the destructive write, the controller 102 receives the notification sent by the disk drive 106a. The controller 102 restores (at block 604), data in the selected emulated blocks on which the destructive write was performed by the disk drive, by copying the data from mirrored data corresponding to the data in the selected emulated blocks, where the mirrored data is maintained via the controller.

Therefore, FIGS. 1-6 illustrate certain embodiments, in which a disk drive sends a notification to a storage controller indicating that a destructive write has taken place within the disk drive. In certain embodiments, the destroyed data is restored from mirrored data maintained by the storage controller. It should be noted that the native block size of the disk drive is greater than the native block size addressed by the operating system, and the disk drive emulates the native block size addressed by the operating system.

Figure 7:
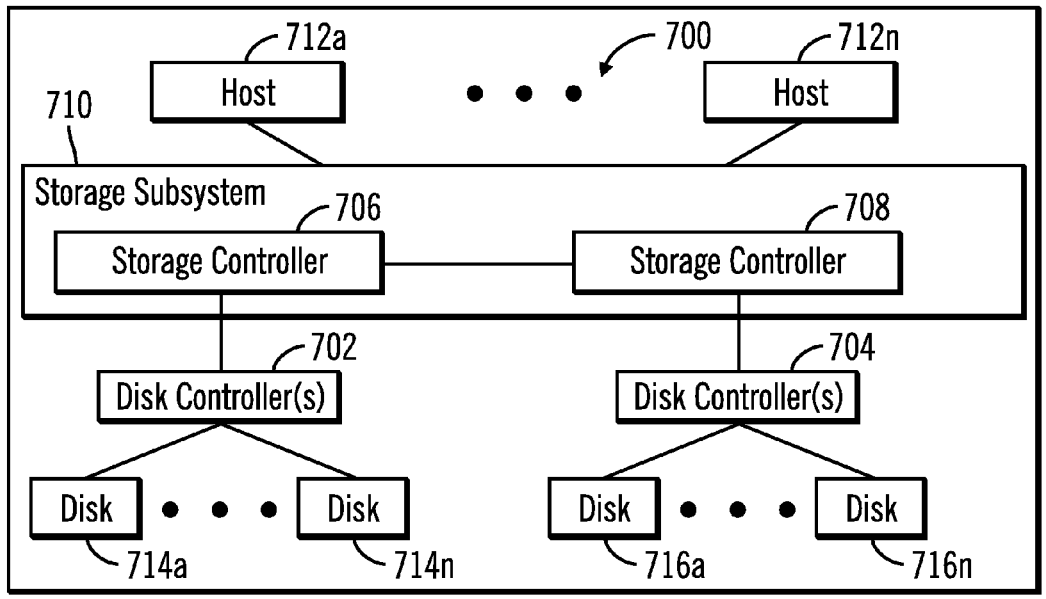
FIG. 7 illustrates a block diagram that shows disk controllers implemented outside storage controllers, in accordance with certain embodiments.

FIG. 7 illustrates a block diagram 700 that shows disk controller devices 702, 704 implemented outside storage controllers, in accordance with certain embodiments. In certain embodiments, the disk controller devices 702, 704 may control exemplary disks configured as a JBOD, RAID, etc. The two storage controllers 706, 708 form a storage subsystem 710 that is coupled to a plurality of hosts 712a . . . 712n, wherein at least one or more of the hosts 712a . . . 712n are configured to access data in a block size of 512 bytes. The storage controller 706 is coupled to a disk controller device 702 that is external to the storage controller 706, and the storage controller 708 is coupled to a disk controller device 704 that is external to the storage controller 708, wherein the disk controller devices 702 and 704 control a plurality of disks 714a . . . 714n and 716a . . . 716n respectively, wherein the plurality of disks 714a . . . 714n and 716a . . . 716n store data in 4K block size. The storage controllers 706 and 708 may substitute each other to respond to requests from any of the hosts 712a . . . 712n.

Therefore, FIG. 7 illustrates certain embodiments in which disk controllers that are external to storage controllers within a storage subsystem map via emulation requests of 512 block size to configurations that store data in a block size of 4 Kilobytes.

Figure 8:
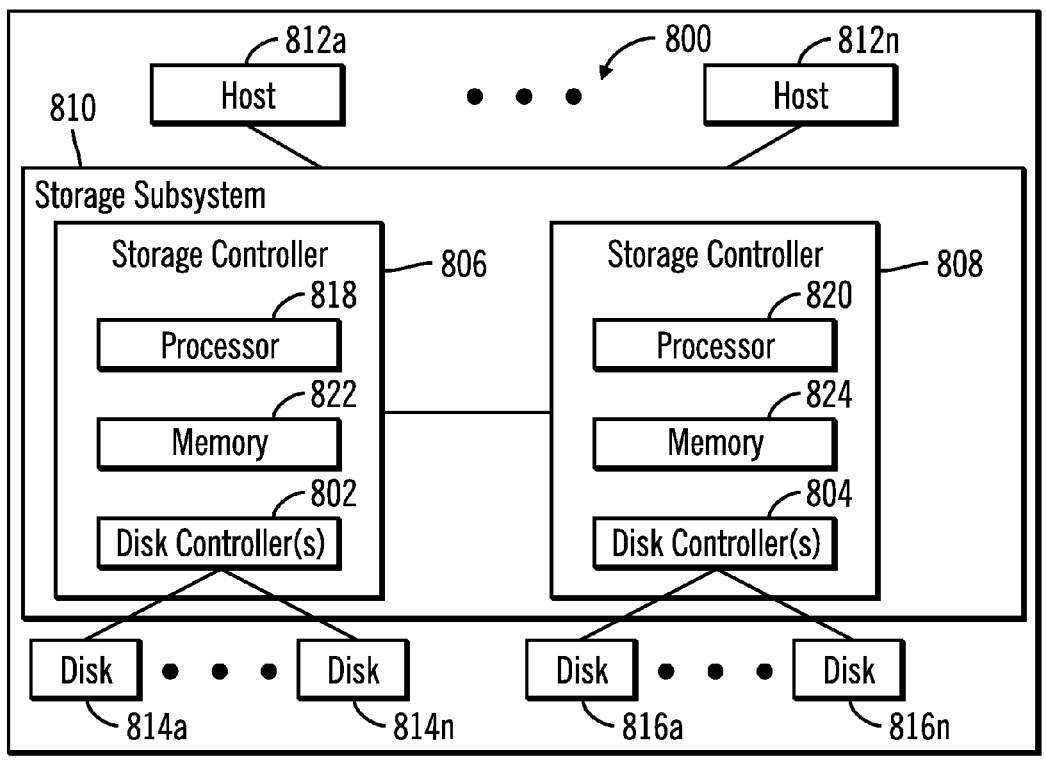
FIG. 8 illustrates a block diagram that shows disk controllers implemented within storage controllers, in accordance with certain embodiments.

FIG. 8 illustrates a block diagram 800 that shows disk controllers 802, 804 implemented within storage controllers 806, 808, in accordance with certain embodiments. The two storage controllers 806, 808 form a storage subsystem 810 that is coupled to a plurality of hosts 812a . . . 812n, wherein at least one or more of the hosts 812a . . . 812n are configured to access data in a block size of 512 bytes. The storage controller 806 is coupled to a disk controller 802 that is internal to the storage controller 806, and the storage controller 808 is coupled to a disk controller 804 that is internal to the storage controller 808, wherein the disk controllers 802 and 804 control a plurality of disks 814a . . . 814n and 816a . . . 816n respectively, and wherein the plurality of disks 814a . . . 814n and 816a . . . 816n store data in 4K block size. The storage controllers 806 and 808 may substitute each other to respond to requests from any of the hosts 812a . . . 812n and each of then storage controllers 806, 808 include at least a processor and a memory (shown via reference numerals 818, 820 that indicate processors, and reference numerals 822, 824 that indicate memory) in addition to the disk controllers.

Therefore, FIG. 8 illustrates certain embodiments in which disk controllers that are internal to storage controllers within a storage subsystem map via emulation requests of 512 block size to disk configurations that stores data in a block size of 4 Kilobytes.

Therefore, FIGS. 1-8 illustrate certain embodiments, in which a disk drive that controls disks that store data natively in 4K blocks is used to emulate 512 byte blocks addressed by an operating system. A plurality of 512 blocks are stored within a 4K block, in order to reduce wastage of storage space. However, in certain embodiments, a read error may occur while reading a 4K block, and the 512 byte blocks that cause the read error are destructively written by the disk drive. The disk drive may send a notification to a storage controller indicating that a destructive write has taken place within the disk drive. The destroyed data is restored from mirrored data maintained by the storage controller.

It may be noted that the host does not need to know that the JBOD or other disk configuration does not natively support the block size used by the host. Additionally, the disk configuration does not need to know that the host does not natively support the block size used by the disk configuration to store information in disks.

It may also be noted that in certain embodiments two disk controllers can share the same disks. For example, in FIG. 7, disk controllers 702 and 704 may both share disks 714*a* . . . 714*n*. In certain embodiments, just as two storage controllers can substitute each other, so can two disk controllers. It may be noted that in certain alternative embodiments, the operations performed by disk drives may instead be performed by a disk controller.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
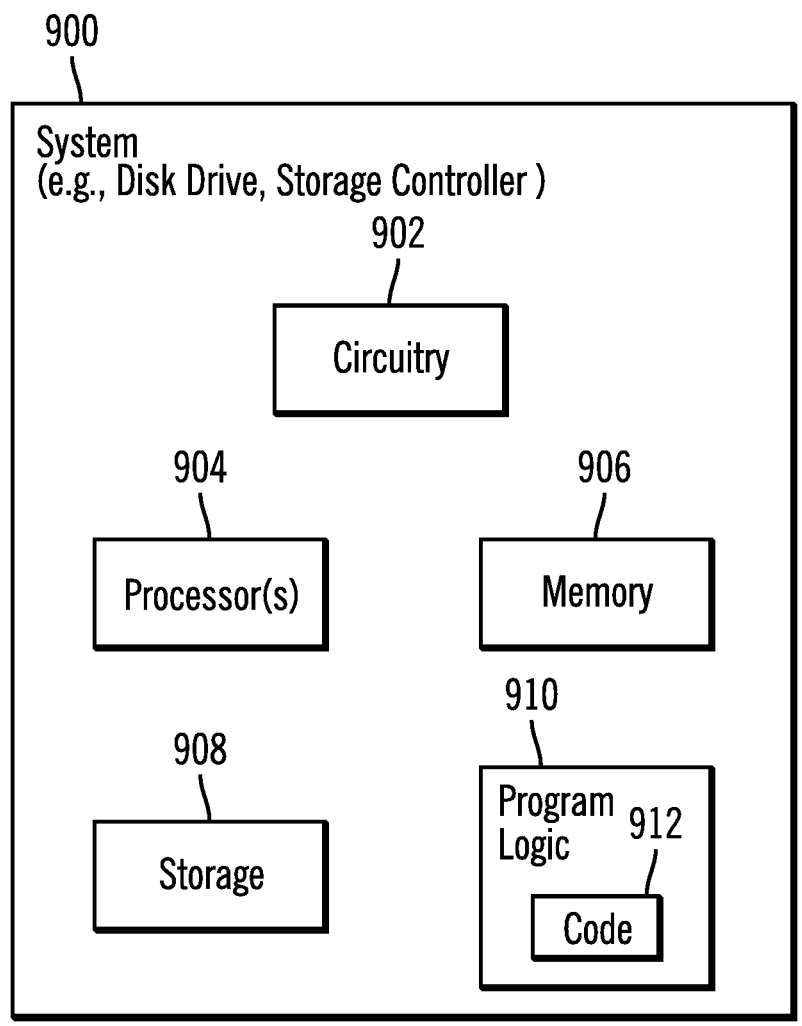
FIG. 9 illustrates a block diagram of a computational system that shows certain elements that may be included in controllers or disk drives, in accordance with certain embodiments.

FIG. 9 illustrates a block diagram that shows certain elements that may be included in the storage controller 102 or the disk drives 106a ... 106n, in accordance with certain embodiments. The system 900 may comprise the storage controllers 706, 708, 806, 808 or the disk drives 106a ... 106n, or the disk controllers 702, 704, 802, 804 and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. * Java is a trademark or registered trademark of Oracle and/or its affiliates.

What is claimed is:

1. A method, comprising:
   receiving, by a disk drive, a request to write at least one block of a first block size, wherein the disk drive is configured to store blocks of a second block size that is larger in size than the first block size, and wherein the disk drive stores via emulation a plurality of emulated blocks of the first block size in each block of the second block size; generating, by the disk drive, a read error, in response to reading a selected block of the second block size in which the at least block of the first block size is to be written via the emulation;
   performing, by the disk drive, a destructive write of selected emulated blocks of the first block size that caused the read error to be generated;
   writing, by the disk drive, the at least one block of the first block size in the selected block of the second block size; and
   sending, by the disk drive, a notification to indicate the performing of the destructive write.

2. The method of claim 1, wherein:
   the first block size is 512 bytes; and
   the second block size is 4 Kilobytes.

3. The method of claim 1, wherein the notification is sent asynchronously to a controller, the method further comprising:
   maintaining, by the disk drive, an indicator that indicates those emulated blocks on which the destructive write is performed, wherein the request to write the at least one block of a first block size is satisfied, even in response to the read error being generated.

4. The method of claim 1, the method further comprising:
receiving, by a controller, the notification sent by the disk drive; and
restoring, by the controller, data in the selected emulated blocks on which the destructive write was performed by the disk drive, by copying the data from mirrored data corresponding to the data in the selected emulated blocks, wherein the mirrored data is maintained via the controller.

5. The method of claim 1, wherein:
the disk drive is coupled to a controller that mirrors data stored in the disk drive;
the request is received by the controller from a host whose operating system is configured to access the blocks of the first block size configured as 512 bytes; and
disks maintained by the disk drive have lesser tolerance for wasted storage space and greater tolerance for increased processing time for executing read and write operations.

6. A method for deploying computing infrastructure, comprising integrating computer-readable code into at least a disk drive, wherein the code in combination with at least the disk drive performs operations, the operations comprising: receiving, by the disk drive, a request to write at least one block of a first block size, wherein the disk drive is configured to store blocks of a second block size that is larger in size than the first block size, and wherein the disk drive stores via emulation a plurality of emulated blocks of the first block size in each block of the second block size; generating, by the disk drive, a read error, in response to reading a selected block of the second block size in which the at least block of the first block size is to be written via the emulation;
performing, by the disk drive, a destructive write of selected emulated blocks of the first block size that caused the read error to be generated;
writing, by the disk drive, the at least one block of the first block size in the selected block of the second block size; and
sending, by the disk drive, a notification to indicate the performing of the destructive write.

7. The method for deploying computing infrastructure of claim 6, wherein:
the first block size is 512 bytes; and
the second block size is 4 Kilobytes.

8. The method for deploying computing infrastructure of claim 6, wherein the notification is sent asynchronously to a controller, the operations further comprising:
maintaining, by the disk drive, an indicator that indicates those emulated blocks on which the destructive write is performed, wherein the request to write the at least one block of a first block size is satisfied, even in response to the read error being generated.

9. The method for deploying computing infrastructure of claim 6, wherein a controller receives the notification sent by the disk drive, and wherein the controller restores data in the selected emulated blocks on which the destructive write was performed by the disk drive, by copying the data from mirrored data corresponding to the data in the selected emulated blocks, wherein the mirrored data is maintained via the controller.

10. The method for deploying computing infrastructure of claim 6, wherein:
the disk drive is coupled to a controller that mirrors data stored in the disk drive;
the request is received by the controller from a host whose operating system is configured to access the blocks of the first block size configured as 512 bytes; and
disks maintained by the disk drive have lesser tolerance for wasted storage space and greater tolerance for increased processing time for executing read and write operations.

* * * * *